United States Patent [19]
Fuchs

[11] Patent Number: 5,150,518
[45] Date of Patent: Sep. 29, 1992

[54] PROCESS FOR MANUFACTURING INNER AND OUTER PARTS FOR A ROTARY PISTON MACHINE IN WHICH THE INNER AND OUTER PARTS HAVE PARALLEL AXES

[75] Inventor: Erwin Fuchs, Altmünster, Austria

[73] Assignee: Weingärtner Maschinenbau Gesellschaft m.b.H., Kirchham, Austria

[21] Appl. No.: 673,956

[22] Filed: Mar. 22, 1991

[30] Foreign Application Priority Data

Mar. 29, 1990 [AT] Austria ................................. 728/90

[51] Int. Cl.[5] ............................................ B23P 15/10
[52] U.S. Cl. ................................ 29/888.04; 29/557; 82/1.3; 82/1.4; 408/1 R; 408/23
[58] Field of Search ................ 29/888.04, 888.049, 29/557; 82/1.3, 1.4, 1.11; 408/1 R, 23, 138, 150

[56] References Cited

U.S. PATENT DOCUMENTS

| | | | |
|---|---|---|---|
| 1,406,871 | 2/1922 | Johnson | 82/1.3 |
| 1,893,810 | 1/1933 | Travis | 82/1.3 |
| 2,627,194 | 2/1953 | Leifer et al. | 82/1.4 |
| 2,887,912 | 5/1959 | Beach | 82/1.3 |
| 3,157,093 | 11/1964 | Shaw et al. | 29/557 X |
| 3,213,525 | 10/1965 | Creighton et al. | 29/557 X |
| 4,215,603 | 8/1980 | Jones | 82/1.3 |
| 4,333,368 | 6/1982 | Watt | 82/1.11 |
| 4,435,893 | 3/1984 | Sims | 29/888.049 X |
| 4,911,043 | 3/1990 | Hoffmann | 82/1.11 X |

FOREIGN PATENT DOCUMENTS

| | | | |
|---|---|---|---|
| 0212210 | 8/1984 | Fed. Rep. of Germany | 29/888.04 |
| 2408836 | 9/1975 | German Democratic Rep. | 29/888.04 |
| 0212211 | 8/1984 | German Democratic Rep. | 29/888.04 |

Primary Examiner—Timothy V. Eley
Assistant Examiner—C. Richard Martin
Attorney, Agent, or Firm—Collard & Roe

[57] ABSTRACT

To manufacture inner and outer parts for a rotary piston machine in which said parts have parallel axes and have interengaging helical engaging surfaces having convolutions in numbers differing by one and are operable to perform relative to each other rotating and eccentric revolving movements, the helical engaging surface of at least one of said parts is machined by a cutting tool, which is rotated about an axis which is parallel to and spaced from the axis of the part that is to be machined. To permit an economical machining of said helical engaging surfaces and to achieve a very good surface finish on said engaging surfaces, a tool which is provided with teeth on an end face and on its peripheral surface is used to machine the helical engaging surface of the one part and those teeth which are provided on the peripheral surface of said tool conform as regards their arrangement and the design of their cutting edges to the profile of the helical engaging surface of the other part, that the tool and said one part are subjected to a feed movement relative to each other, which feed movement is composed of a basic feed movement, which corresponds to the relative operating movement of the inner and outer parts, and of a superposed movement, which corresponds to the desired helical shape of the engaging surface to be machined.

2 Claims, 4 Drawing Sheets

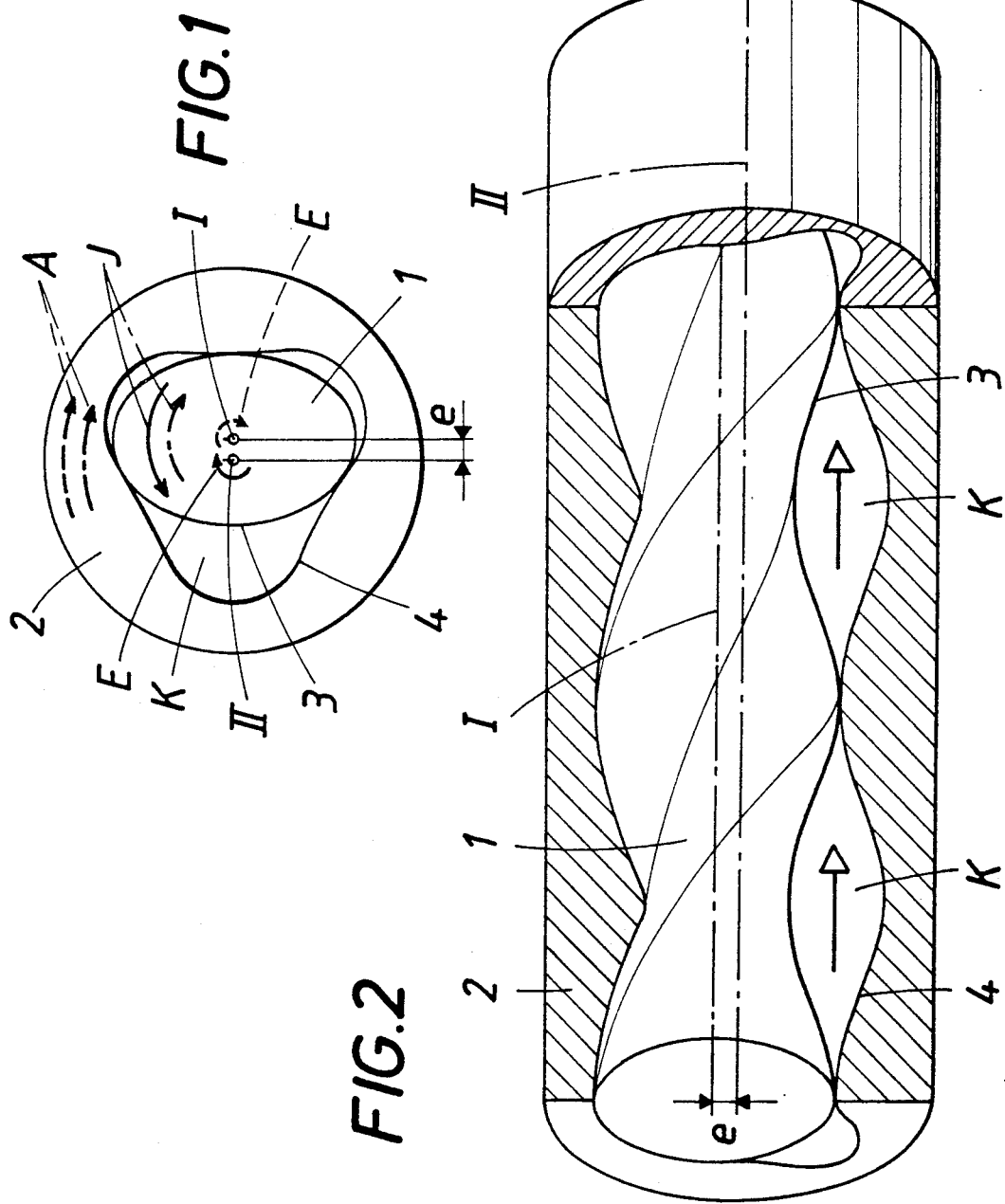

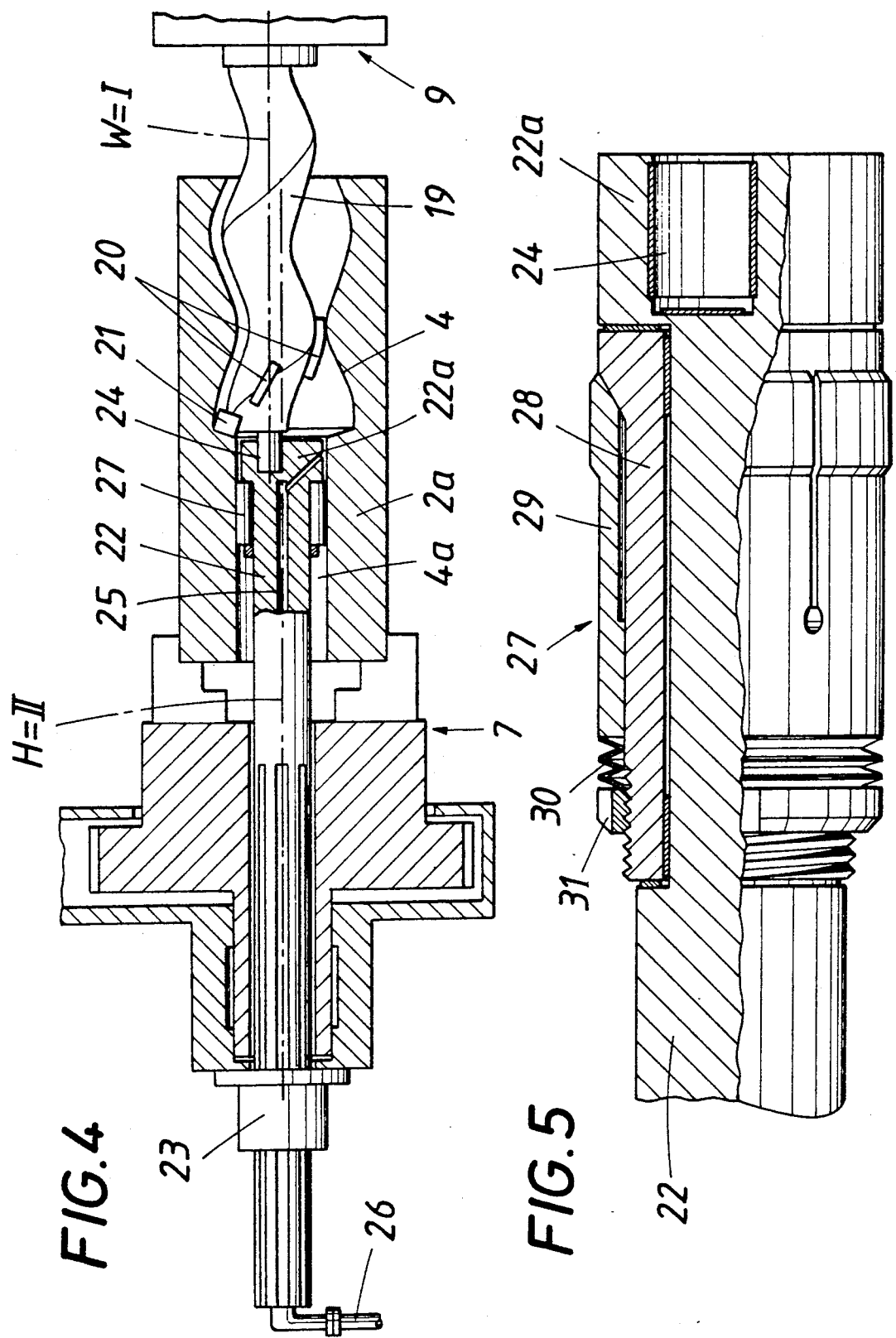

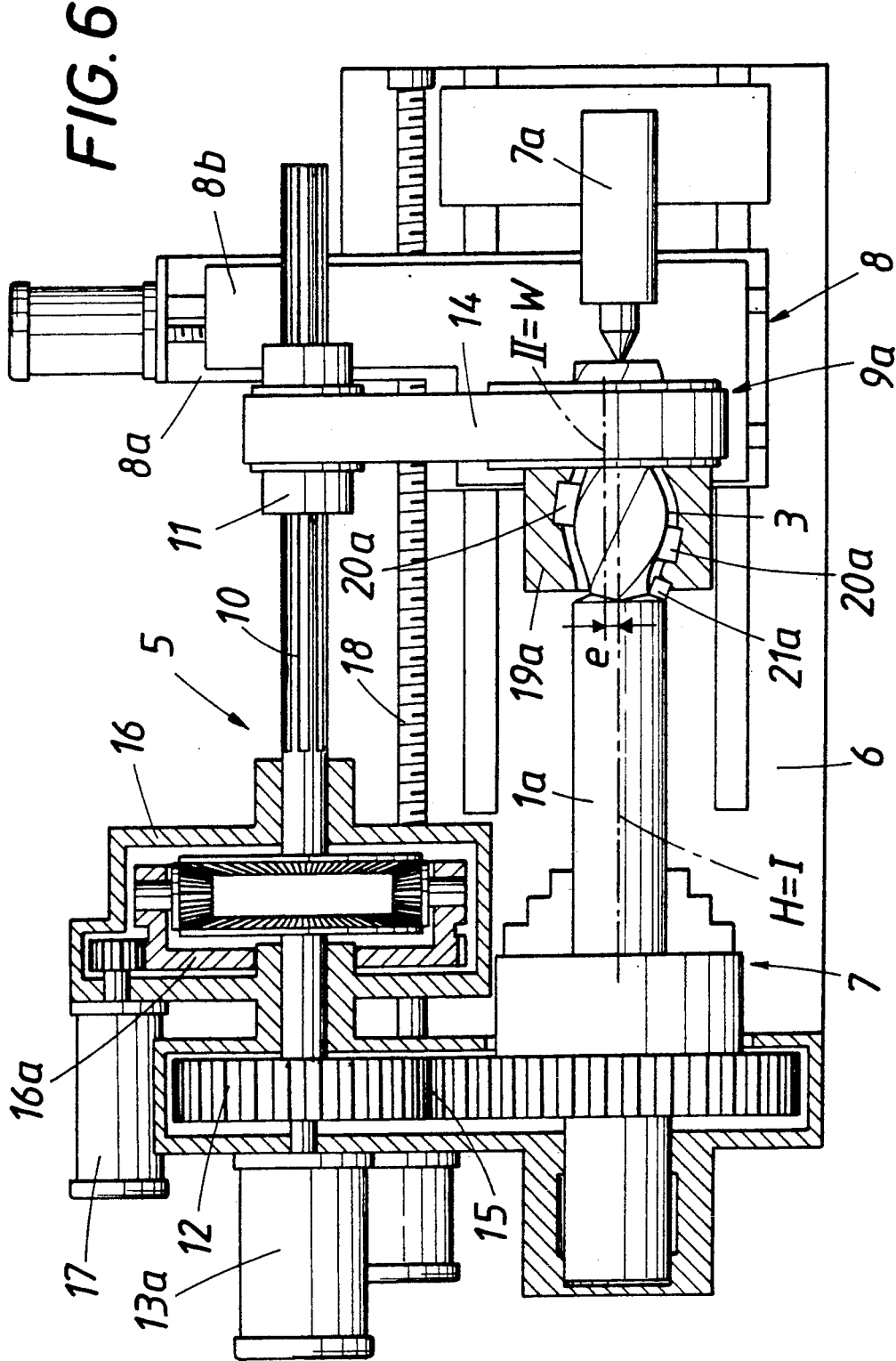

PROCESS FOR MANUFACTURING INNER AND OUTER PARTS FOR A ROTARY PISTON MACHINEIN WHICH THE INNER AND OUTER PARTS HAVE PARALLEL AXES

BACKGROUND OF THE INVENTION

1. Field of the Invention

This invention relates to a process of manufacturing inner and outer parts for a rotary piston machine in which said parts have parallel axes and interengaging helical engaging surfaces having convolutions differing in numbers by one and are operable to perform rotating and eccentric revolving movements relative to each other. At least one of said parts is machined by a cutting tool, which is rotated about an axis which is parallel to and spaced from the axis of the part that is to be machined.

2. Description of the Prior Art

A rotary piston machine of such special type will be obtained if the helical engaging surfaces of the cooperating inner and outer parts, are screwed together in such a manner that the closed individual chambers remaining between the inner and outer parts will move along the axes of the parts in case of a corresponding relative movement. Such machines may be used as pumps, which are known as Mohno pumps and serve to handle particularly liquids having a relatively high viscosity, and when energized by a liquid flow can be used as motors, e.g., for a rotary drive of drilling heads and the like. The relative movement may be imparted to the inner and outer parts in three different ways: the outer part may be stationary and the inner part may rotate and may eccentrically revolve about the axis of the outer part; or the inner part may be stationary and the outer part may rotate and may eccentrically revolve about the axis of the inner part, or the inner and outer parts having axes spaced apart from each other by a certain eccentricity may rotate at the same time.

In the manufacture of the inner and outer parts of such rotary piston machines it is particularly difficult to machine the outer part, which has an internal engaging surface which is accessible only with difficulty for being machined by conventional turning and milling tools. For this reason it is conventional to prefabricate a core, which permits the outer parts to be cast. But in that case an elastic material, such as rubber, is used or the outer part must be split. When known cutting tools are used to machine the engaging surface, such tools will be required to form not only the respective cross-sections out of the blank but they must also rotate the cross-section in steps during the longitudinal feed movement to provide the helical engaging surface. For this reason only very low feed rates are permissible and the manufacturing times are very long. Besides, the stability of the tool when cutting will be low because owing to the geometrical relationships between the cross-section and the helical shape and the resulting small clearance space the shank of the tool must be very thin so that it has only a low flexural and torsional stiffness. If the ratio of the diameters between the cross-section to be formed and the milling tool employed exceeds a certain value, a machining of the engaging surface of the outer part will not be possible even in theory because in that case the tool shank will have to be smaller than zero. Owing to the low stability of the tool when cutting it is also virtually impossible to manufacture relatively long parts and such a manufacture will require that sufficiently short parts be joined by adhesion, screwing, welding and the like. Besides, the machining of the cavity of the outer part in layers will inevitably result in stepped traces formed by the machining so that the feed rate will be further restricted and the desired surface finish will be adversely affected.

Various machines are known for a machining of the external helical engaging surfaces of the inner parts and such machines perform a whirling operation for manufacturing single-convolution engaging surfaces of inner parts having a screwed circular cross-section or for making inner parts having engaging surface having one or more convolutions use a profile-milling cutter, which is guided along the lead of the desired profile, or a numerically controlled standard milling cutter. Such machines can only be used to machine external surfaces but cannot be used to machine internal surfaces.

SUMMARY OF THE INVENTION

For this reason it is an object of the invention to eliminate these disadvantages and to provide a process which is of the kind described first hereinbefore and which ensures that the helical engaging surfaces of the inner and outer parts can economically be formed with a very high surface finish.

The object mentioned above is accomplished in accordance with the invention with a manufacturing process which comprises machining the interengaging surface of each part with a cutting tool rotating about an axis extending parallel to the axis of the part, the cutting tool having respective cutting teeth at an end face of the tool and on a peripheral surface of the tool, and the cutting teeth on the peripheral surface being arrayed to conform in shape to the surface of the part, the machining being effected by a compound movement of the tool and the part relative to each other, the compound movement being composed of a movement simulating the basic operating movement of the parts and a superposed movement of the cutting teeth on the peripheral surface along a helical path simulating the shape of the helical surface. Because the tool and particularly its portion provided with the cutting teeth corresponds to the geometric configuration of one of the two cooperating parts and the tool and the part that is to be machined move relative to each other just as the cooperating parts more in the rotary piston machine, the machining by the tool will necessarily result in the exact formation of the countersurface if a helical movement corresponding to the helical shape of the engaging surface is superposed on that basic feed movement. As a result, the engaging surfaces of inner parts can be made like those of outer parts and the engaging surface which is obtained will have an optimum surface finish. It is possible to use a tool which is relatively large in diameter so that the tool has a very high stability when cutting and relatively high feed rates are permissible. That high stability of the tool when cutting will also permit relatively long parts to be made in one piece so that the part need not be split in length. Because the tool corresponds to one of the two cooperating parts the machining will not be restricted by a desired ratio of diameters and the machining will not form steps in the surface but may, at most, result in shallow scalelike traces from cutting for each revolution of the tool; such traces will result from all machining operations.

If the tool is driven to rotate about an axis which is eccentric to the axis of the part which is to be machined and the tool is advanced along said eccentric axis relative to the part, which is driven to rotate about its axis, the required feed movement will be obtained without an eccentric revolution of one axis relative to the other so that said feed movement can be effected in a simple manner and the eccentricity of the two axes can easily be adjusted by a transverse displacement for an adaptation to workpieces having different shapes.

The machine tool which serves to manufacture inner and outer parts for use in a rotary piston machine preferably comprises a workpiece holder for axially fixing a part that is to be machined and a tool carrier, which is mounted on a tool carriage for rotation about an axis of rotation that is parallel to and spaced from the axis of the workpiece holder, which tool carrier is adapted to be driven to rotate about said axis of rotation, and an inserted-tooth cutter, which is detachably fixed to said tool carrier and is provided on one end face and on its peripheral surface with inserted cutting teeth and has a shape which generally conforms to an inner or an outer part, wherein those of said cutting teeth which are provided on the peripheral surface of said cutter match the cross-sectional shape of the helical engaging surface of the associated inner or outer part that is to be machined, and the workpiece holder and the tool carrier are mounted to be axially displaceable and capable of performing an eccentric revolution and a rotation relative to each other and adapted to be driven to perform said axial displacement, eccentric revolution and rotation. By means of such a machine tool the cutting tool and the part which is to be machined can be moved relative to each other and can be screwed one into the other so that the engaging surface of each of the outer and inner parts can be machined by means of a cutting tool which corresponds to the inner or outer part. This can be accomplished in that a movement which consists of an axial movement and a simultaneous rotary movement and corresponds to the desired helical shape of the engaging surface to be machined is superposed on a basic feed movement which corresponds to the usual operating movement of the inner and outer parts relative to each other and the cutting tool which is provided with inserted teeth on one end face and is provided on its peripheral surface with cutting teeth having cutting edges which conform to the geometrical shape of the helical engaging surface of the other part will then form the blank exactly with the desired helical engaging surface.

If the tool carriage consists of a longitudinal carriage and a cross-slide and if the axial distance between the workpiece holder and the tool carrier is adjustable and they are adapted to be driven at a predetermined speed ratio, it will be possible to effect the required feed movements by drive means which involve a low expenditure. In that case the cross-slide of the tool carriage will permit an adjustment of the eccentricity and the longitudinal carriage will perform the axial feed movement required for the screwing movement. In that case simple rotary movements of the tool carrier and the workpiece holder will be sufficient for effecting the desired feed movement and the required speed ratio will be determined by the difference between the number of convolutions of the helical engaging surfaces of the outer and inner parts and by the rotary movement which contributes to the screwing movement.

It will also be desirable to provide a synchronizing shaft, which is parallel to the axes of the workpiece holder and of the tool carrier and from which the tool carrier is adapted to be driven by an axially slidable wheel and the workpiece holder is adapted to be driven by an axially fixed wheel so that a common primary drive for the workpiece and the tool can be adopted. In that case the axially slidable wheel will permit the desired longitudinal feed movement to be performed in spite of the driving connection.

It will also be desirable to operatively connect the synchronizing shaft between said slidable and fixed wheels to a superposing transmission, which is adapted to be controlled in dependence on the helical shape of the engaging surface and on the actual longitudinal feed movement of the tool because the screwing movement can be effected in dependence on the actual longitudinal feed movement by such a superposing transmission. The superposing transmission may consist of a conventional differential gear and for a control of the superposed motion may be provided with mechanical or electronic actuating means which are operated in dependence on the movement of the longitudinal carriage or from the means for driving said longitudinal carriage.

In a particularly desirable design, a mandrel rod is provided, which during the machining of the engaging surface of an outer part protrudes into the cavity of the hollow-cylindrical blank for such outer part and which is non-rotatably and axially slidably mounted in the workpiece holder and which at that end that protrudes into said cavity has an eccentric abutment for backing the cutting tool. By that mandrel rod the cutting tool can be supported also at its free end that protrudes into the blank for the outer parts so that the stability of the tool when cutting will substantially be increased and higher feed rates and the manufacture of longer workpieces will be permitted.

If the mandrel rod is centered and guided in the cavity of the blank for the outer part, the mandrel rod will be supported within the workpiece and the machining forces will be taken up in an improved manner by the resulting non-positive connection between the workpiece and the tool.

If the mandrel rod is guided by means of an expanding cone, which is mounted on the mandrel rod, and by an expanding sleeve, which surrounds said cone and is axially adjustable relative thereto by means of a positioning drive, preferably with an expanding spring interposed, the mandrel rod will be centered by said guiding means even if the diameters of the cavity are not exactly determined or vary over the length of the blank and a backlashfree engagement will always be ensured. The positioning drive may consist of an adjusting screw, which preferably prestresses an expanding spring, so that the expanding sleeve can be yieldably fitted onto the expanding cone by means of the expanding spring.

It will also be desirable to use a mandrel rod which is formed with a longitudinal passage for supplying a fluid, such as air or liquid, to the cavity of the blank because this will permit a cooling of the tool and of the work-piece to be effected by means involving only a low expenditure and will also permit any chips to be removed in that air or liquid is supplied to the cavity.

BRIEF DESCRIPTION OF THE DRAWING

FIGS. 1 and 2 are respectively an end elevation and a perspective view, partly in section, and show an illustrative embodiment of an inner part and an outer part of a rotary piston machine in accordance with the invention.

FIGS. 4 and 5 are side elevations showing partly in section and on a different scale details of modified embodiments of said machine tool.

FIG. 6 is a top plan view showing partly in section a machine tool for machining an inner part of the machine shown in FIGS. 1 and 2.

DETAILED DESCRIPTION OF THE PREFERRED EMBODIMENTS

Figure 3:
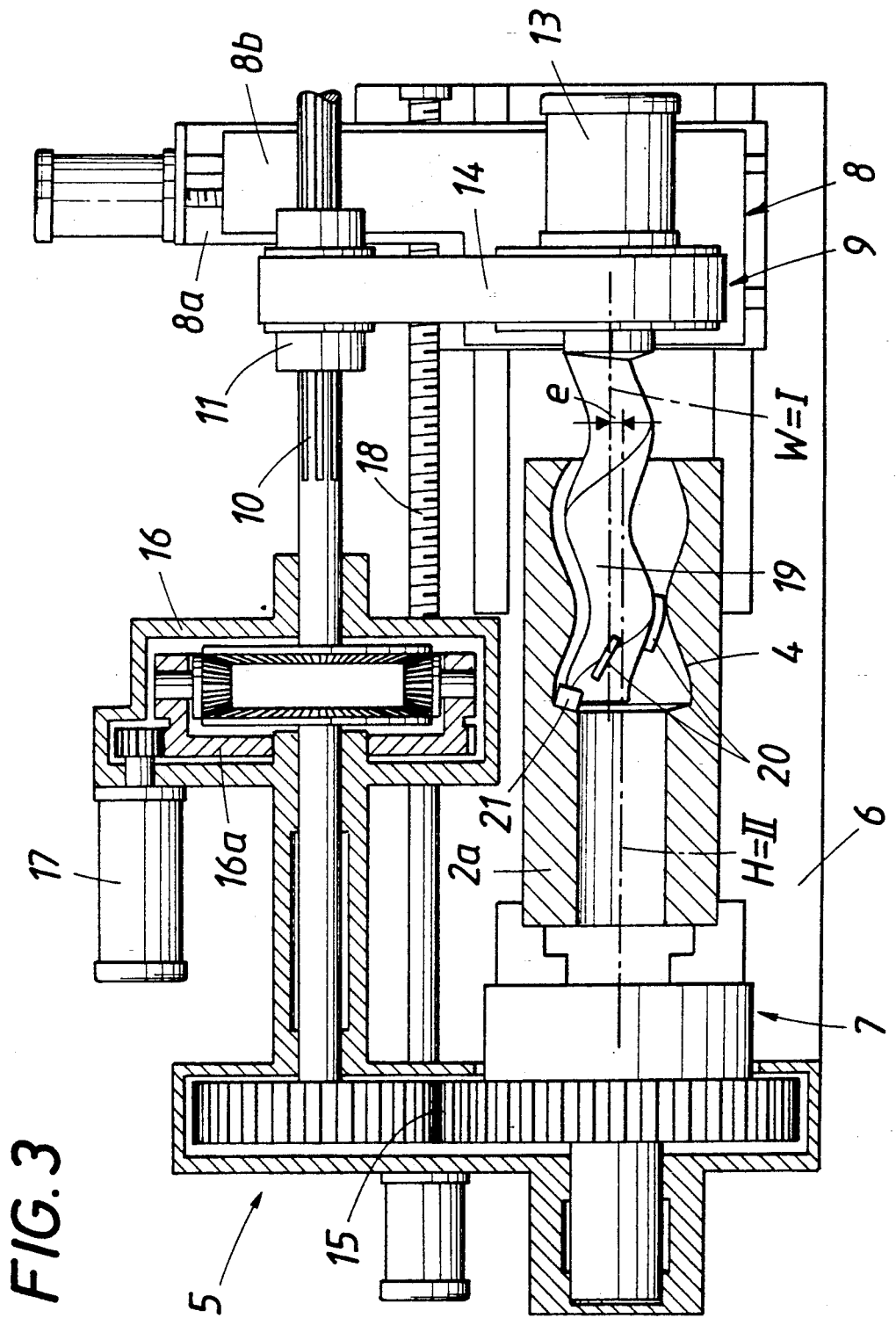
FIG. 3 is a top plan view showing partly in section a machine tool which serves to manufacture an outer part of such a machine.

Illustrative embodiments of the invention will now be described more in detail with reference to the drawing.

The rotary piston machine shown in FIGS. 1 and 2 consists of a Mohno pump and comprises an inner part 1 and an outer part 2, extending into each other and having parallel axes I, II spaced apart by the eccentricity e. Parts 1 and 2 have interengaging helical surfaces 3, 4 whose convolutions differ in numbers by one. In the embodiment shown by way of example the number of convolutions of the engaging surface 4 of the outer part 2 is larger by one than the number of convolutions of the engaging surface 3 of the inner part 1 and the engaging surfaces 3 and 4 of the inner and outer parts 1 and 2 are centered on the respective axes I and II. As a result, a relative screwing movement of the inner and outer parts 1 and 2 will result in an axial displacement of the chambers K, which are defined by the engaging surfaces 3 and 4, so that a pumping action will be effected and even liquids having a relatively high viscosity can effectively be handled. If that operation is reversed, i.e., liquid is forced through the chambers K, it will be possible to operate the rotary piston machine as a motor for imparting a rotary drive.

The relative basic operating movement between the inner and outer parts 1 and 2 may be composed of centered rotary movements and eccentric revolving movements of the parts 1 and 2. It is possible to hold the outer part 2 in position and to rotate the inner part 1 and to cause it to revolve about the axis II of the outer part, as is indicated by arrows J, E, or the inner part 1 may be held in position and the outer part 2 may be driven to rotate and to revolve about the axis I of the inner part 1, as is indicated by the dotted arrows A, E, or both the inner and outer parts 1 and 2 may be caused to rotate while the axes I and II which define the eccentricity e are fixed.

To permit an economical machining of the helical engaging surfaces 3 and 4 of the inner and outer parts 1 and 2, two tools are employed, each of which simulates that part which is to cooperate with the part that is to be machined so that the tool will exactly provide the part which is to be machined with the desired helical engaging surface if a basic feed movement is performed which corresponds to the operating movement performed by the inner and outer parts during the normal operation of the rotary piston machine, and if a superposed screwing movement, which corresponds to the desired helical shape of the engaging surface of the part which is to be machined, is performed at the same time.

A machine tool 5 which can be used to perform such machining is shown in FIG. 3. A workpiece holder 7 for axially fixing a part that is to be machined is mounted on a machine bed 6, which is diagrammatically indicated, and a tool carriage 8 is guided on the machine bed 6 and is provided with a tool carrier 9 for mounting a suitable cutting tool. The tool carriage 8 is composed of a longitudinal carriage 8a and a cross-slide 8b and like the workpiece holder 7 the tool carrier 9 is rotatably mounted and adapted to be driven. The axes of rotation H, W of the workpiece holder 7 and the tool carrier 9, respectively, are parallel to each other and in dependence on the position of the cross-slide 8b are spaced a certain eccentricity e apart. As a common drive for the tool carrier 9 and the workpiece holder 7, a synchronizing shaft 10 is provided, which is parallel to the axes of rotation H and W and which is operatively connected to the tool carrier 9 by an axially slidable wheel 11 and to the workpiece holder 7 by an axially fixed wheel 12. A drive motor 13 is connected to the tool carrier 9, and is operable to drive not only the tool but also the workpiece holder. Intermediate transmission 14, 15 ensure a desired speed ratio between the wheels 11 and 12. A rotary movement is to be superposed on that speed ratio so and together with a longitudinal feed movement is required for shaping a helical surface. For this purpose a superposing transmission 16 is operatively connected to the synchronizing shaft 10 between the wheels 11 and 12 so that the desired movement will be superposed if the crown wheel 16a is properly driven. If the means 17 for driving the crown wheel 16a is controlled in dependence on the longitudinal feed movement of the tool carriage 8 that is in dependence on the screw 18 driving the carriage 8, the feed movement which is required for the machining of the helical surface can be performed in addition to the relative motions of the tool and the workpiece.

The illustrative embodiment shown in FIG. 3 is used to machine the engaging surface 4 of an outer part 2. For that purpose the cutting tool 19 which is fixed in the tool carrier 9 has generally the shape of an inner part 1 and is provided on its periphery with cutting teeth 20 which exactly match the cross-sectional shape of the helical engaging surface 3 of the inner part 1. The tool 19 is provided on its end face with inserted cutting teeth 21, by which the tool can cut into a hollow-cylindrical blank 2a. The feed movement which is imparted to the tool 19 must be composed of a basic feed movement corresponding to the relative operating movement normally performed by the inner and outer parts during the operation of the rotary piston machine, and of a superposed helical movement for shaping a helical engaging surface 4 in the outer part.

As is apparent from FIG. 4 the stability of the tool 19 when cutting can be increased by a mandrel rod 22 introduced into the cavity 4a of the blank 2a for the outer part. By means 23 that mandrel rod 22 is supported in the workpiece holder 7 and is axially slidably mounted in the workpiece holder 7 but is held against rotation relative thereto. At its free end 22a which protrudes into the cavity 4a the mandrel rod 22 is provided with an abutment 24 for backing the tool 19. The mandrel rod 22 is centered and guided in the blank 2a for the outer part 2 and the abutment 24 is eccentric and relative to the axis H of the workpiece holder 7 has an eccentricity which is equal to the eccentricity of the axes H, W of the workpiece holder 7 and of the tool carrier 9 so that the workpiece and the tool can perform the required rotary movements in spite of the backing of the tool.

The mandrel rod 22 is formed with a longitudinal passage 25, through which air or a cooling liquid can be supplied from a suitable external port 26 to the region in which the machining operation is being performed so that the tool and/or the workpiece will be cooled and the chips obtained can be discharged.

To improve the obsorption of the force involved in the backing of the tool 19, the mandrel rod 22 is supported by guiding means 27 within the blank 2a for the outer part 2. As is indicated in FIG. 5 such guiding means 27 may be constituted by an expanding cone 28, which is shrunk-fitted on the mandrel rod 22 and on which an expanding sleeve 29 is slidably mounted, sleeve 29 is forced against the expanding cone 28 by an expanding spring 30 and an adjusting nut 31 for prestressing the spring 30. That simple arrangement will ensure a centering guidance of the mandrel rod 22 and can adapt itself to irregularities of the shape of the cavity 4a.

Just as the engaging surface 4 of an outer part 2, the engaging surface 3 of an inner part 1 can be machined, as is illustrated in FIG. 6. The machine tool 5 is substantially the same but the workpiece holder 7 which is employed is adapted to accommodate a rod-shaped blank 1a and the tool 19a generally corresponds to the outer part 2 to be associated with the inner part 1 that is to be machined. The cutting teeth 20a which are provided on the peripheral surface of the tool 19a exactly match the cross-sectional shape of the helical engaging surface 4 of the outer part 2. The cutting teeth 21a provided on the forward end face permit the tool 19a to cut axially into the rod-shaped blank 1a and ensure that a transitional surface will be formed between the peripheral surface and the end face of the inner part. In that case the required feed movement can be achieved in a simple manner; that feed movement will composed of the normal relative movement performed by the inner and outer parts during the operation of the rotary piston machine and of a superposed helical movement and will result in an exact machining of the helical engaging surface 3 of the inner part 1. Because in that case the workpiece holder 7 comprises a tailstock 7a, the tool carrier is preferably not directly driven but the synchronizing shaft 10 is driven by a motor 13a that is coupled to the shaft 10.

It will be understood that the invention is not restricted to the embodiments shown by way of example but the process in accordance with the invention might also be carried out by other suitable machines, such as a machine in which the workpiece is fixed in position and the tool is driven to rotate and to eccentrically revolve.

I claim:

1. A process for manufacturing inner and outer parts of a rotary piston machine, the inner and outer parts having respective axes extending parallel to, and spaced apart from each other, and having respective outer and inner interengaging helical surfaces, the surfaces having convolutions differing in number by one, and the parts being operable to rotate and to revolve eccentrically about the axes thereof relative to each other in a basic operating movement, which process comprises machining the interengaging surface of either the inner or the outer part with a cutting tool rotating about an axis extending parallel to the axis of the part, the cutting tool having cutting teeth at an end face thereof and on a peripheral surface thereof, and the cutting teeth on the peripheral surface being arranged to conform in shape to the surface of the part, the machining being effected by a compound movement of the tool and the part relative to each other, the compound movement being composed of a movement simulating the basic operating movement of the part and a superposed movement of the cutting teeth on the surface of the part along a helical path simulating the shape of the helical surface.

2. The manufacturing process of claim 1, wherein the axis of the cutting tool is eccentric to the axis of the part, the cutting tool and the part are driven about the respectively axes thereof, and the cutting tool is axially moved towards the part.

* * * * *